United States Patent [19]
Witter

[11] Patent Number: 6,073,035
[45] Date of Patent: Jun. 6, 2000

[54] SYSTEM UNAVAILABLITY POWER REDUCTION METHOD WITH EARLY FAILURE AND NO ROTATION

[75] Inventor: Robert C. Witter, Lawrenceville, Ga.

[73] Assignee: Oki Telecom, Inc., Suwanee, Ga.

[21] Appl. No.: 08/696,034

[22] Filed: Aug. 9, 1996

[51] Int. Cl.[7] .............................. H04B 1/38; H04M 1/00; H04Q 7/20
[52] U.S. Cl. ........................................ 455/574; 455/434
[58] Field of Search .................................. 455/574, 434, 455/525, 515, 38.3, 343, 454, 553, 552, FOR 38.3, FOR 343, FOR 100; 379/FOR 103, FOR 104, 464, 435, 450–452, 509; 370/311, 252

[56] References Cited

U.S. PATENT DOCUMENTS

| | | | |
|---|---|---|---|
| 4,731,814 | 3/1988 | Becker et al. | 455/574 |
| 5,241,690 | 8/1993 | Larsson et al. | 455/54.1 |
| 5,392,287 | 2/1995 | Tiedemann, Jr. et al. | 370/95.1 |
| 5,408,682 | 4/1995 | Ranner et al. | 455/464 |
| 5,418,839 | 5/1995 | Knuth et al. | 455/464 |
| 5,420,911 | 5/1995 | Dahlin et al. | 455/553 |
| 5,442,806 | 8/1995 | Barber et al. | 455/435 |
| 5,574,996 | 11/1996 | Raith | 455/161.3 |
| 5,603,081 | 2/1997 | Raith et al. | 455/435 |
| 5,627,882 | 5/1997 | Chien et al. | 455/464 |
| 5,627,883 | 5/1997 | Maeda et al. | 455/464 |
| 5,648,955 | 7/1997 | Jensen et al. | 370/252 |
| 5,740,534 | 4/1998 | Ayerst et al. | 455/434 |
| 5,754,956 | 5/1998 | Abreu et al. | 455/434 |
| 5,799,256 | 8/1998 | Pombo et al. | 455/574 |

Primary Examiner—Dwayne D. Bost
Assistant Examiner—Tracy M. Legree
Attorney, Agent, or Firm—Thomas, Kayden, Horstemeyer & Risley LLP

[57] ABSTRACT

The present invention includes a method and an apparatus for reducing power consumption in a wireless telephone. The wireless telephone is programmed to enter a reduced power mode for a sleep interval of time upon failing to access a base station. Additionally, the overall base station accessing process is considerably shortened by only searching once through the sequence of available carrier spectrums (e.g., digital and analog carriers for multi-mode mobile stations) before entering the reduced power mode. Also, when searching through a code division multiple access (CDMA) channel, the present invention includes searching only once through all pseudo-random number (PN) code timing locations when searching for a base station.

18 Claims, 6 Drawing Sheets

SYSTEM UNAVAILABLITY POWER REDUCTION METHOD WITH EARLY FAILURE AND NO ROTATION

BACKGROUND OF THE INVENTION

The present invention relates to the field of telecommunications, and more specifically, to the field of power control in wireless telephones.

Conventional portable wireless telephones are powered by rechargeable batteries. The operational life of the wireless telephone between battery charges is directly dependent on the charge life of the battery. In addition, the charge life of a battery is related to the battery size, which is a major factor in determining the weight of the phone since batteries are generally relatively heavy compared to the remaining elements of the phone. Thus, the battery is a critical component of the phone and is a major factor in determining the phone's physical and operational characteristics, i.e. size, weight, and operational life span.

In an effort to make portable wireless telephones smaller, more portable, and of greater operational life between battery charges, the wireless telephone industry is continually searching for ways to extend the charge of the battery. The power consumption of the phone is important since a phone that uses less power will operate longer per battery charge. Furthermore, a phone that uses less power can be powered by a smaller, lighter battery and still retain an acceptable operational life span between battery charges. As a result, the phone unit is less massive, more portable, and generally more convenient to use.

The conventional method followed by a mobile station (wireless telephone) when attempting to access a base station is to continuously scan available carrier spectrums in search of acceptable signals from a base station. According to the conventional method, if the mobile station fails to find and begin communication with a base station after searching through the available carrier spectrums, the search process continues rotating through the available carrier spectrums searching for acceptable base station signals until a base station is accessed, the mobile station is turned off by a user, or the battery becomes depleted of usable energy. Unfortunately, the conventional mobile station has no other way of knowing if a base station is accessible or when one will become accessible. Therefore, the mobile station wastes power and reduces the charge life of the battery as it continuously searches for a base station when the mobile station is in an area not covered by wireless service or where service is otherwise unavailable, such as a result of carrier selection programming, maximum caller volume, etc.

Multi-mode mobile stations are capable of operating in two or more different modes for use in two or more different types of communication systems, such as conventional analog FM (frequency modulation), digital CDMA (code division multiple access), digital TDMA (time division multiple access), and others. Among the various types of radios and communication devices, one particular type of multi-mode communication device is a dual-mode CDMA/FM radio telephone capable of operating in both analog FM systems and digital CDMA systems. This type of mobile station is able to search for base station signals in CDMA and FM carrier spectrums. Any given cellular area throughout the United States is currently serviced by up to two competing providers of cellular airtime communication services. The two service providers in any given geographic area are commonly referred to as "A" and "B" carriers and are assigned different groups of frequencies or frequency sets. It is, of course, up to each service provider to decide which types of communication modes to support, as well as how many channels and resources to devote to each mode. For areas in which each service provider supports both CDMA and FM communication modes, a typical dual-mode CDMA/FM cellular mobile station continually rotates through the CDMA "A", FM "A", CDMA "B", and FM "B" carrier spectrums searching for base station signals. The order in which these systems are searched is typically determined by mobile station programming.

According to conventional dual-mode CDMA/FM searching methods, besides continuously rotating through all supported carrier spectrums, the mobile station repeatedly searches through all potential base station locations associated with a particular carrier spectrum until either an acceptable base station signal is found or a maximum search time limit expires for that type of carrier spectrum. When in a CDMA searching mode, the conventional dual-mode CDMA/FM mobile station continuously searches for acceptable base station signals by searching for a valid CDMA base station pilot channel. Pilot channel signals are transmitted by all CDMA base stations using the same pseudo-random number (PN) code. However, pilot channel signals are transmitted with different PN code timing offsets to allow the base stations to be distinguished by the mobile station. The mobile station searches repeatedly through all PN code timing locations (timing hypotheses) when attempting to acquire a CDMA base station pilot channel. Unless an acceptable base station pilot signal is detected before a maximum search time limit expires, the mobile station begins searching instead for acceptable base station signals in the next carrier spectrum, such as, for example, the FM "A" carrier spectrum. When searching in, for instance, the FM "A" carrier spectrum, the typical dual-mode CDMA/FM cellular mobile station repeatedly searches through all available frequency channels (frequency locations) in that carrier spectrum (i.e., FM "A") in an attempt to find an acceptable analog base station signal. Unless an acceptable base station signal is detected before a maximum search time limit expires, the mobile station begins searching instead for acceptable base station signals in the next carrier spectrum, such as, for example, the CDMA "B" carrier spectrum. Consequently, the conventional searching methods are very time-consuming and wasteful of mobile station battery power.

There is, therefore, a need in the industry for a system which addresses these and other related, and unrelated, problems.

SUMMARY OF THE INVENTION

Briefly described, the present invention includes a method and an apparatus for reducing power consumption in a wireless telephone. The wireless telephone is configured to enter a reduced power mode for a sleep interval of time upon failing to access a base station. According to the preferred embodiment of the present invention, the overall base station accessing process in the mobile station is considerably shortened whereby the mobile station enters the reduced power mode after searching only once (without rotation) through the sequence of available carrier spectrums. Also, an early failure method is utilized whereby the mobile station searches only once through all potential base station locations associated with a particular carrier spectrum. For example, while searching through a CDMA carrier spectrum in search of a base station pilot signal, the present invention includes searching only once through all PN code timing locations (time hypotheses).

Entering the reduced power mode includes reducing the power used by various components of the mobile station. According to one example of the preferred embodiment of the present invention, a dual-mode CDMA/FM radio telephone includes, among other elements, a central processing unit (CPU), a mobile station modem (MSM) for processing digital signals, and a radio frequency (RF) receiver (RX) section. These components are run according to internal electronic clocks, the oscillation frequencies of which affect the power consumption of the components. The internal clocks associated with the CPU, MSM, and RX section are controlled (the frequency is slowed or increased) by writing to power control registers associated with the CPU, and MSM. The CPU is programmed to write to the power control registers.

After an attempt to access a base station has failed, a sleep timer is started in the CPU, and the MSM is powered down to a reduced power mode, followed by the RX section. After the RX section has powered down, the CPU powers down to complete the transition to the reduced power mode. After the sleep timer expires, the CPU, RX Section and MSM are restored to full power, and the phone again searches the available carriers in an attempt to access a base station. The above process is repeated until a base station is accessed or the telephone is turned off by the user.

In accordance with the preferred embodiment of the present invention, full power is restored and the base station accessing process is repeated when either the user pushes a key of the key pad of the phone or the sleep timer has expired. In accordance with an alternate embodiment of the present invention, the functionality is identical to the preferred embodiment with the exception that a particular (emergency number) combination of keys must be pressed by the user to cause full power to be restored before the sleep timer has expired.

It is therefore an object of the present invention to reduce the amount of power consumed by a wireless telephone upon failure to access a base station.

Another object of the present invention is to reduce the power consumption level of a wireless telephone upon failing to acquire a CDMA pilot channel during a pilot channel acquisition process.

Yet another object of the present invention is to reduce the power consumption level of a wireless telephone after searching through a single sequence of digital and analog carrier spectrums.

Still another object of the present invention is to reduce the time required to search through a single carrier spectrum.

Another object of the present invention is to search only once through all PN code timing locations before entering a reduced power mode.

Other objects, features, and advantages of the present invention will become apparent upon reading and understanding this specification, when taken in conjunction with the accompanying drawings.

DETAILED DESCRIPTION OF THE PREFERRED EMBODIMENT

Figure 1:
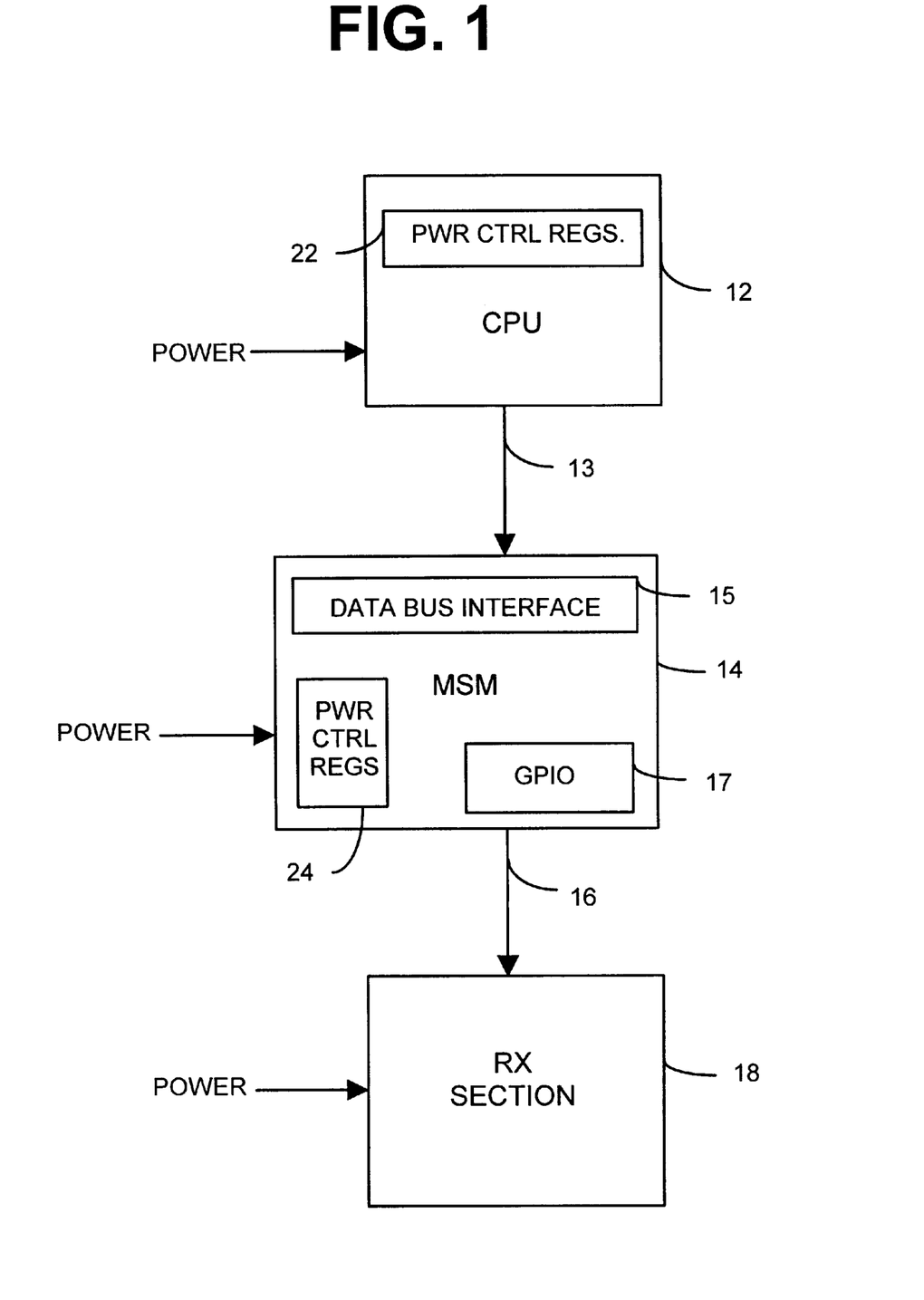
FIG. 1 is a block diagram representation of selected portions of a dual-mode wireless telephone in accordance with a preferred embodiment of the present invention.

Referring now to the drawings, FIG. I shows a central processing unit (CPU) 12 connected through a data bus 13 to a data bus interface 15 of a mobile station modem (MSM) 14. A sleep mode line 16 connects a receiver (RX) section 18 with a general purpose input/output port (GPIO) 17 on the MSM 14. The power consumption of the CPU 12 is affected by the contents of power control registers 22 inside the CPU 12, and the power consumption of the MSM 14 is affected by the contents of power control registers 24 inside the MSM 14. These power control registers 22, 24 control various clocks that drive various internal circuits in the CPU 12 and the MSM 14, respectively. The sleep mode line 16 is used to turn off hardware in the RX section 18 by removing current to various discrete elements and other circuits in the RX section 18. It is understood that the elements shown in FIG. 1 constitute only a small portion of a complete mobile station, thus other conventional mechanisms and circuits necessary for operation of the mobile station would be easily understood by those reasonably skilled in the art.

Figure 2:
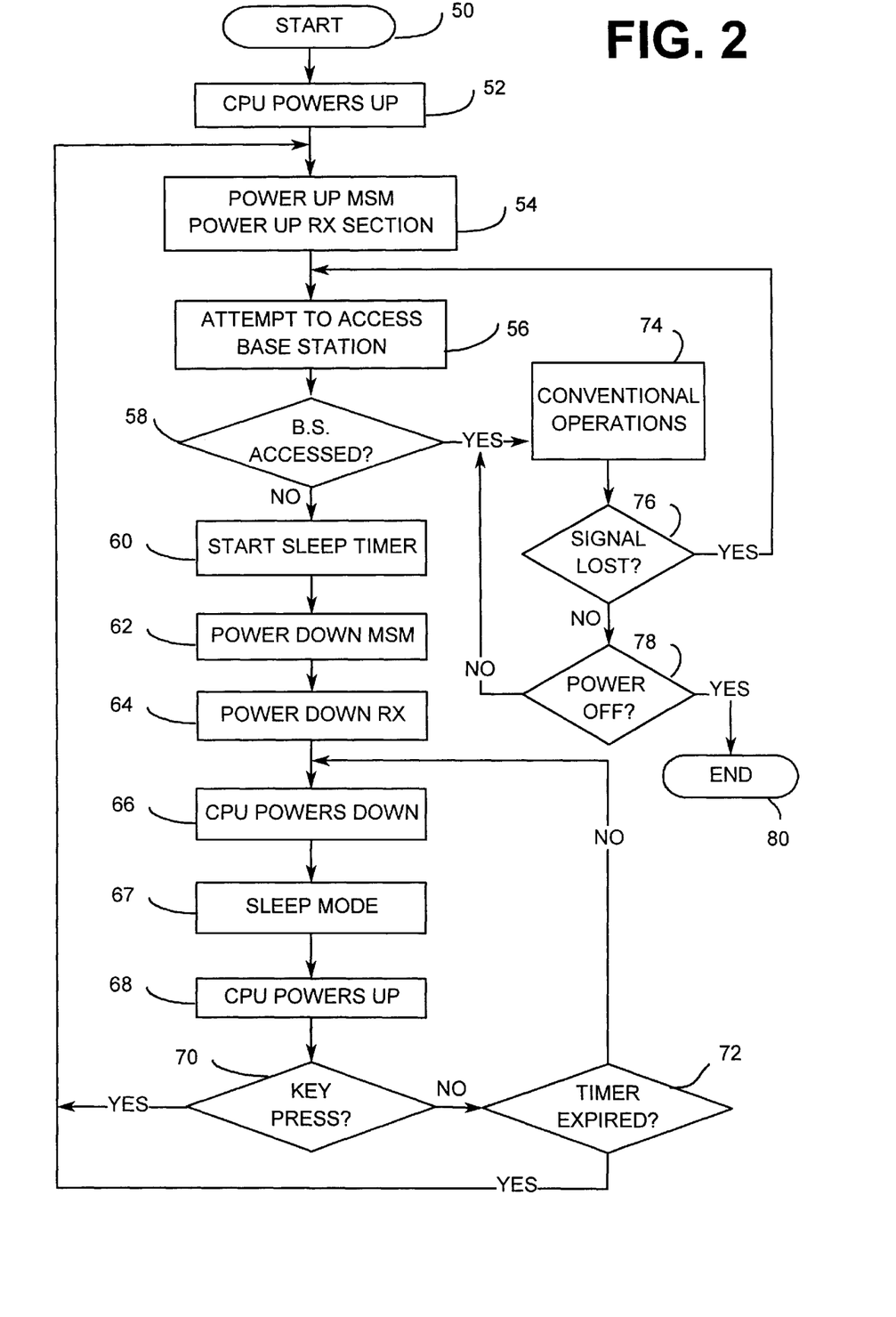
FIGS. 2–6 are flow chart representations of the operation of the present invention, in accordance with the preferred embodiment of FIG. 1.

FIGS. 2–6 are flow chart representations of the operation of the present invention, in accordance with the preferred embodiment of the present invention. Referring now to FIG. 2 (with occasional reference to elements shown in FIG. 1), after the mobile station begins operation (step 50), the CPU 12 powers up (step 52). As shown in step 54, the MSM 14 and then the RX section 18 begin drawing full power, as controlled by the CPU 12. After the CPU 12, MSM 14, and the RX section 18 are powered up and stabilized, the mobile station attempts to access a base station (step 56). In accordance with the preferred embodiment of the present invention, the method of the present invention followed by the mobile station when attempting to access a base station is to search only once through a sequence of available carrier spectrums before deciding (step 58) if a base station will be accessed before entering a sleep mode. The step of attempting to access a base station further includes, in accordance with the preferred embodiment, reducing the amount of time required to search once through the sequence of available carrier spectrums.

In accordance with conventional dual-mode CDMA/FM mobile station operation, the particular sequence of available carrier frequency spectrums is user-programmable in the mobile station of the present invention. For example, the mobile station user may prefer a carrier system sequence consisting of CDMA "A", FM "A", CDMA "B", and FM "B". Thus, when the mobile station attempts to access a base station, it first will search for a base station within the digital "A" carrier system. If a digital "A" carrier system base station is unavailable, the mobile station next searches for a base station in the analog "A" carrier system, and so on through the sequence. A more detailed description of the methods and steps involved in step 56 are presented in FIGS. 3–6, in accordance with one implementation of the preferred embodiment of the present invention. Of course, the scope of the present invention includes other sequences and other types of carrier selection methods, such as those accommodating other communication systems and those incorporating different classifications and lists of carriers outside the conventional A/B system selection scheme.

After step 56 (FIG. 2) it is determined (step 58) whether a base station has been accessed. If a base station has been accessed, the "yes" branch of decision step 58 is followed, and the mobile station enters a conventional operations stage (step 74) whereby the mobile station communicates with the base station to receive and transmit overhead and control information, to receive and initiate calls, and to conduct handoffs to other base stations. Periodically, the mobile station decides (step 76) if the base station signal has been lost. If the signal is lost, as the "yes" branch of decision step 76 indicates, the mobile station again attempts to access a base station (step 56). If the signal is not lost, the "no" branch of decision step 76 indicates that the mobile station determines if the user has pushed the power-off key (decision step 78). If the mobile station power-off key has not been pushed, the mobile station returns to the conventional operations stage (step 74). If the mobile station has been powered off, then the process is ended (step 80), and the mobile station goes into its standard power off routine as would be understood by those skilled in the art.

If it is decided (step 58) that a base station has not been accessed, the "no" branch of decision step 58 indicates that the mobile station goes into a power down routine (steps 60, 62, 64, and 66). First, a sleep timer in CPU 12 is initiated and begins to count down (step 60). Next, the MSM 14 is powered down (step 62) as a result of the CPU 12 writing to the MSM 14 power control registers 24. According to one implementation of the preferred embodiment, the MSM 14 then essentially blocks an external clocking signal to effectively disable internal functions of the MSM 14 normally driven by the clocking signal. Next, the CPU 12 signals the RX section 18 to go into a power reduction mode by appropriately driving the sleep mode line 16 (step 64). In response, hardware in the RX section 18 draws much less current. Finally, the CPU 12 writes to its own CPU power control registers 22 to slow the driving clocks, and thus the power consumption rate, of the CPU 12 (step 66). At this point, the mobile station is operating in the reduced power (sleep) mode (step 67).

While the MSM 14 and RX section 18 continue in the sleep mode, the CPU 12 wakes up periodically to monitor the sleep timer, to monitor for user input, such as a key-press from the mobile station user, and to perform other brief system maintenance operations. Typically, these "partial sleep" times are very short. After the CPU 12 powers up (step 68), the mobile station determines if a key has been pressed by the user (decision step 70). If a key has been pressed, then the "yes" branch of decision step 70 indicates that the MSM 14 and RX section 18 are again powered up (step 54), and another attempt to access a base station is made (step 56). If a key has not been pressed, then, as indicated by the "no" branch of decision step 70, the sleep timer of the CPU 12 is checked for expiration (step 72). If the sleep timer has expired, as indicated by the "yes" branch of decision step 72, the MSM 14 and RX section 18 are again powered up (step 54), etc. If the sleep timer has not expired, as indicated by the "no" branch of decision step 72, the CPU 12 immediately powers down (step 66), and the mobile station returns to the complete sleep mode (step 67). In another embodiment of the present invention, the mobile station determines if the user is attempting to dial the 911 emergency number (or any other phone number designated as an emergency number) in decision step 70 rather than accepting any key sequence to power up the MSM 14 and RX section 18.

Figure 4:
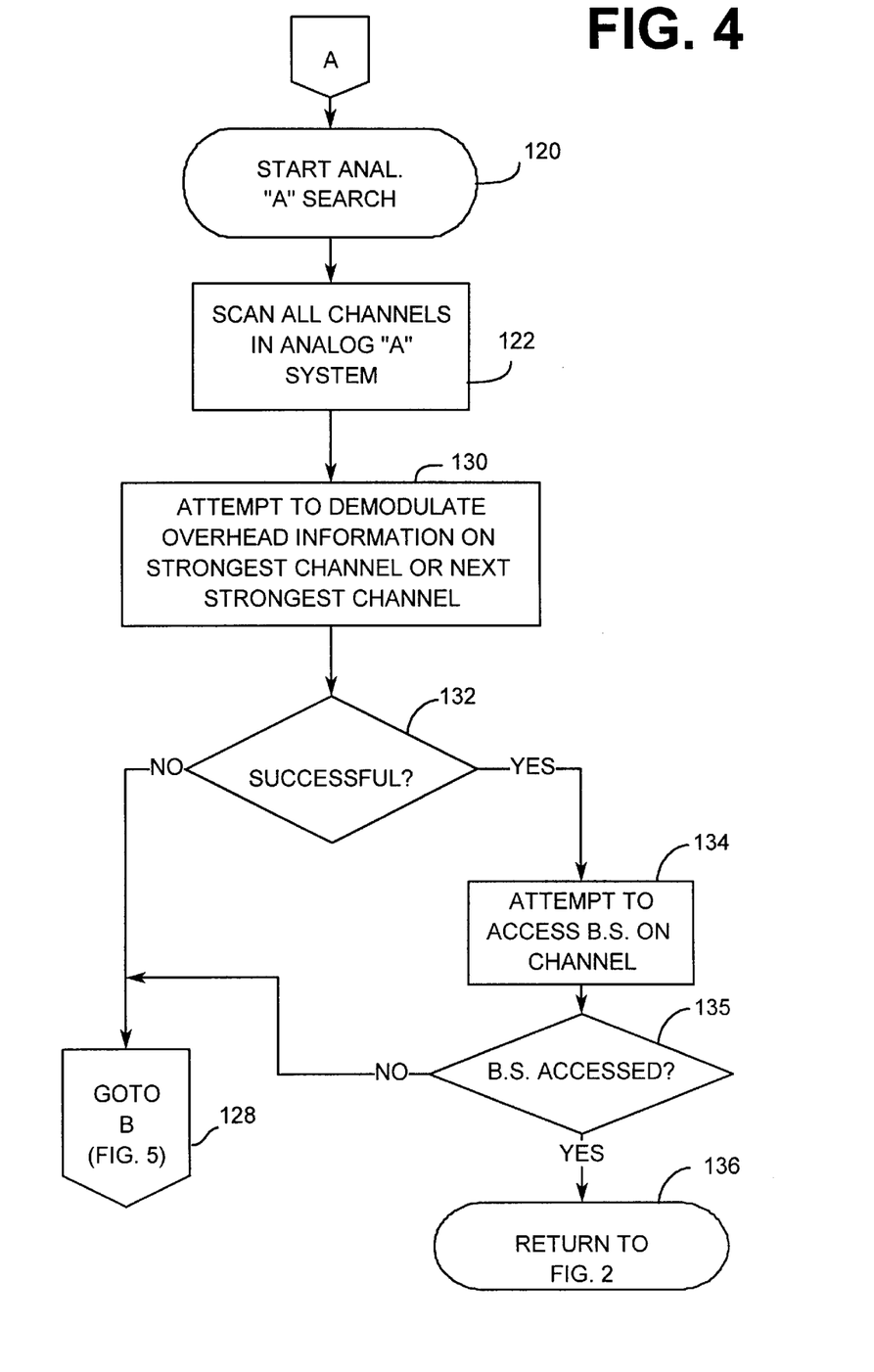
Figure 5:
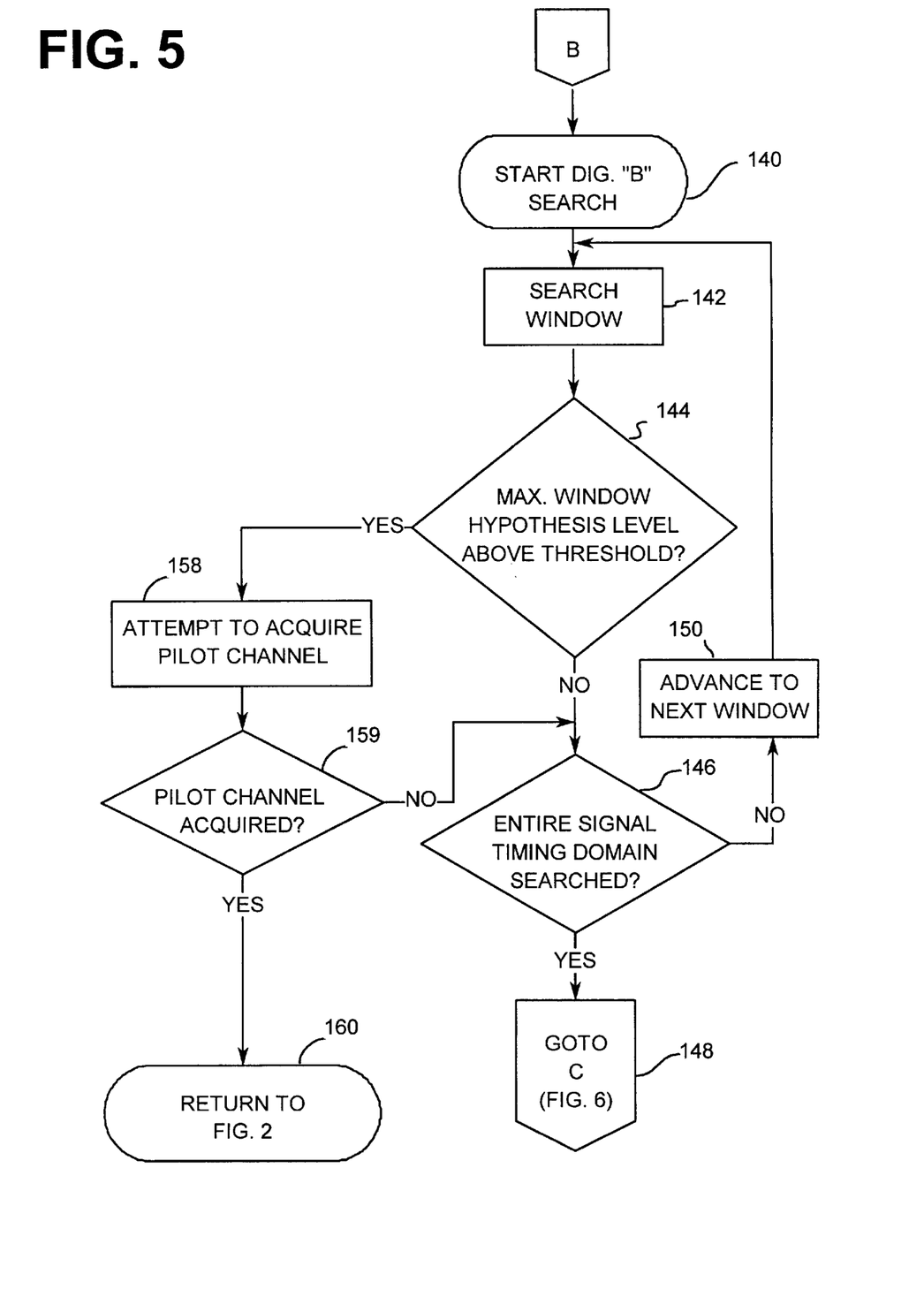
Figure 6:
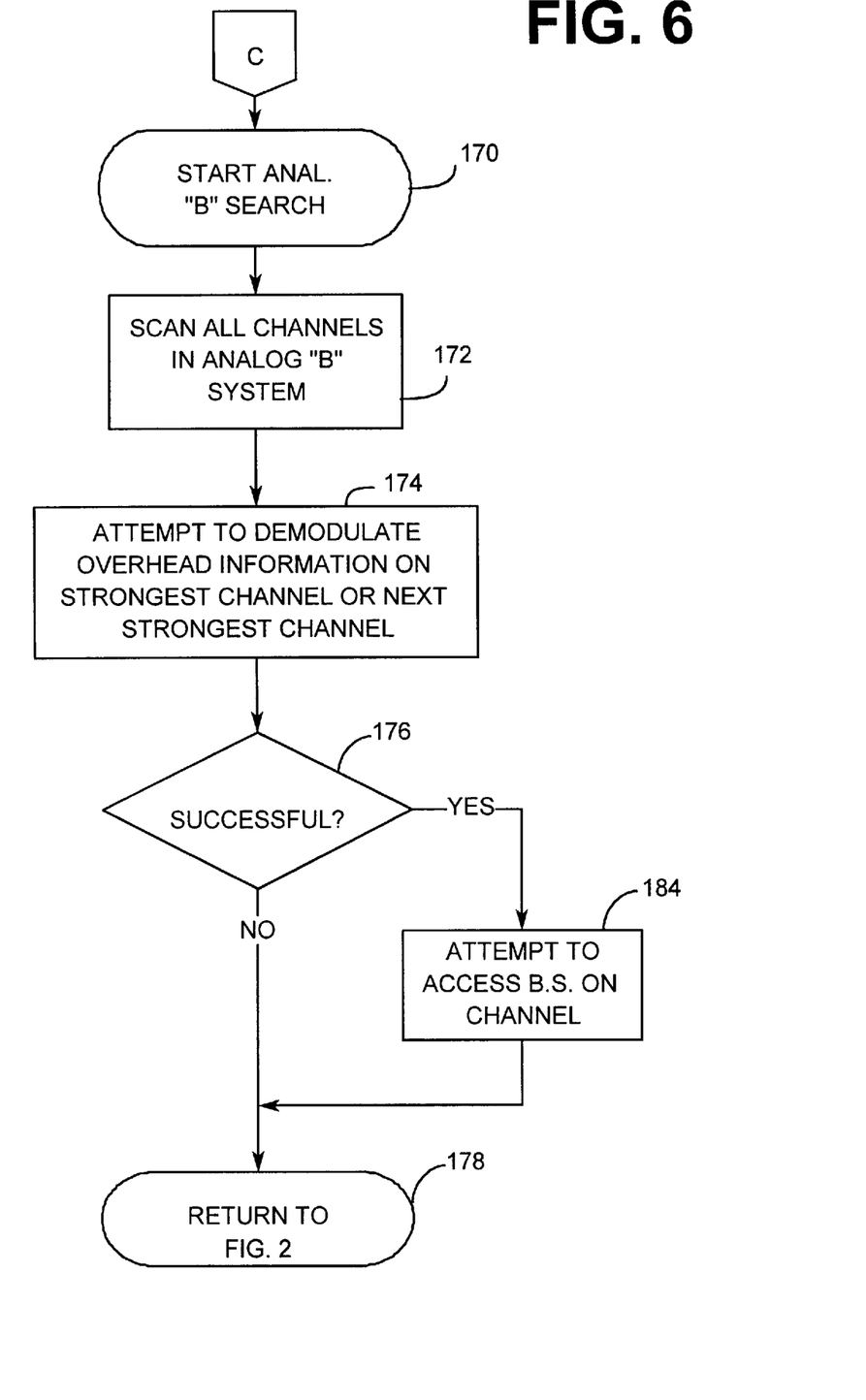

Refer now to FIGS. 3–6 for the following discussion of the mobile station's attempt to access a base station (step 56 of FIG. 2), in accordance with one example implementation of the preferred embodiment of the present invention. In this example carrier system search sequence configuration, the mobile station, when attempting to access a base station, will first search for a base station in the digital (CDMA) "A" carrier system (FIG. 3), then in the analog (FM) "A" carrier system (FIG. 4), then in the digital "B" carrier system (FIG. 5), and then the analog "B" carrier system (FIG. 6).

Figure 3:
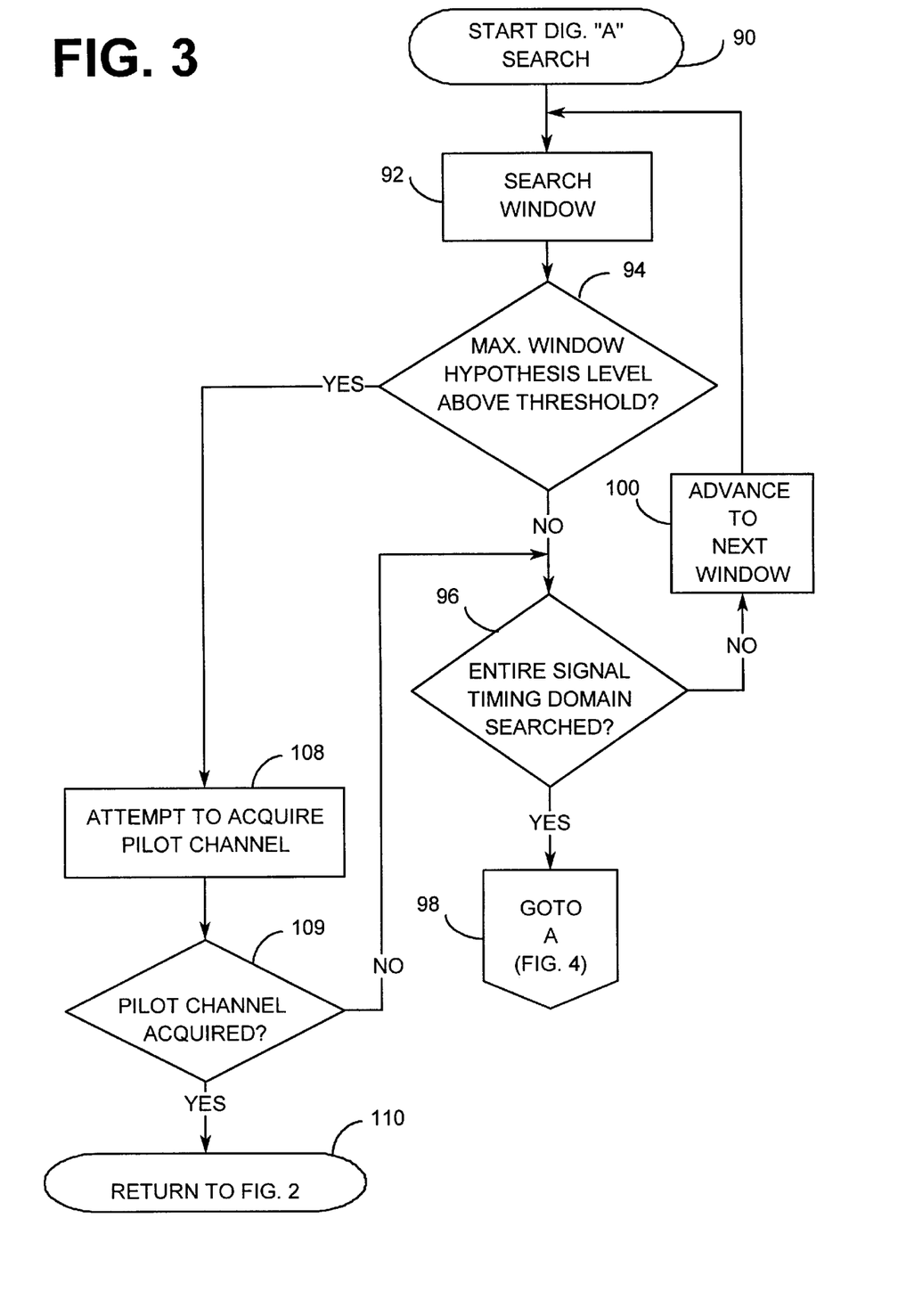

Referring now to FIG. 3, after the digital "A" system search operation of the present invention begins (step 90), the mobile station (the MSM 14, as directed by the CPU 12) searches through one conventional search window of PN time hypotheses (timing locations) (step 92). As part of searching through a search window of timing locations, the mobile station measures a hypothesis magnitude level for each timing location and determines a maximum detected hypothesis magnitude level for that search window. The mobile station then determines (decision step 94) if the maximum hypothesis magnitude level detected within the search window is above a signal threshold value. If so, as indicated by the "yes" branch of decision step 94, the mobile station attempts to access a pilot channel at the discovered timing location having the hypothesis magnitude level above the signal threshold value (step 108). If a pilot channel is acquired at that timing location (hypothesis), a base station has been accessed and operation returns to FIG. 2 (the "yes" branch of decision step 109).

If a pilot signal is not acquired (the "no" branch of decision step 109) or if the maximum hypothesis magnitude level is found to be below the signal threshold value (the "no" branch of decision step 94), the mobile station determines (step 96) if the entire signal timing domain for that CDMA channel has been searched, i.e., whether the entire set of PN timing locations have been searched. If so, then the "yes" branch of decision step 96 indicates that the search process advances to the next carrier system in the defined carrier system sequence, i.e., the analog "A" system (FIG. 4) in this example implementation. If the entire signal timing domain has not been searched, then the "no" branch of decision step 96 indicates that the search advances to the next search window (step 100) so that the process starting with step 92 is repeated. Of course, other embodiments of the present invention include more than one CDMA channel per carrier system (e.g., primary CDMA "A" and secondary CDMA "A"). In such embodiments, the additional CDMA channels are also similarly searched before the search process advances to the next carrier system in the sequence of carrier systems.

FIG. 4 is a flow chart representation of the mobile station analog "A" system search operation of the present invention, in accordance with one example implementation of the preferred embodiment of the present invention. After the search operation starts (step 120), the mobile station scans all analog "A" channels (step 122) and measures the received strength of each channel. The mobile station then attempts to demodulate overhead information (the conventional overhead message train) on the strongest channel detected, and if the strongest channel is not acceptable, the mobile station also attempts to demodulate overhead information on the next strongest channel (step 130). If the mobile station is not successful in this attempt, the "no" branch of decision step 132 indicates that the search proceeds to the next carrier system (step 128 to FIG. 5). Otherwise, the mobile station attempts to access the base station over the channel on which the overhead information was demodulated (step 134), and operation returns to FIG. 2 if a base station is accessed (the "yes" branch of decision step 135). Otherwise, as indicated by the "no" branch of decision step 135, the search proceeds to the next carrier system (step 128 to FIG. 5).

FIG. 5 is a flow chart representation of the mobile station digital "B" system search operation of the present invention, in accordance with the example implementation of the preferred embodiment of the present invention. The method and steps involved in searching digital system "B" are similar to the method and steps followed in searching digital system "A" which is described above and depicted in FIG.

3. If all windows of the entire signal timing domain are searched without finding a base station, the "no" branch of decision step 146 is followed, and the search advances to the analog "B" carrier system. FIG. 6 is a flow chart representation of the mobile station analog "B" system search operation of the present invention, in accordance with the example implementation of the preferred embodiment of the present invention. The method and steps involved in searching analog system "B" are similar to the method and steps followed in searching analog system "A" which is described above and depicted in FIG. 4. However, since this is the last carrier system in the example carrier system sequence, all paths of operation return to FIG. 2 for an evaluation (step 58) of whether a base station has been accessed.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of any means- or step-plus-function elements in the claims below are described to include any structure, material, or acts for performing the claimed functions in combination with other claimed elements as specifically claimed.

I claim:

1. A mobile station method for conserving power, said method comprising steps of:
  attempting to access a base station, including defining a sequence of carrier spectrums to search, wherein the sequence of carrier spectrums includes at least one code division multiple access (CDMA) channel having a plurality of pseudo-random number (PN) code timing positions, and wherein the step of attempting to access a base station includes searching only once through all PN code timing positions of the CDMA channel;
  operating in a reduced power consumption mode throughout a sleep time interval responsive to failing to access any base station after searching only once through the sequence of carrier spectrums; and
  increasing mobile station power consumption after operating in the reduced power consumption mode throughout the sleep time interval.

2. The method of claim 1, wherein the operating step includes terminating the reduced power consumption mode responsive to detecting user key input.

3. The method of claim 1, wherein the operating step includes steps of
  powering down a mobile station modem (MSM), including loading power control registers in the MSM to slow clocks used by the MSM,
  powering down a mobile station receiver section after powering down the MSM, including driving a sleep control line communicating with the receiver section, and
  powering down a mobile station central processing unit (CPU) after powering down the receiver section, including loading power control registers in the CPU to slow clocks used by the CPU.

4. A mobile station method for conserving power, said method comprising steps of:
  attempting to access a base station; and
  operating in a reduced power consumption mode throughout a sleep time interval responsive to failing to access any base station,
    wherein the attempting step includes steps of defining a sequence of carrier spectrums to search, and searching only once through the sequence of carrier spectrums before operating in the reduced power consumption mode, and
    wherein the operating step includes terminating the reduced power consumption mode responsive to detecting user key input.

5. The method of claim 4, further comprising steps of
  increasing mobile station power consumption after operating in the reduced power consumption mode throughout the sleep time interval; and
  repeating the attempting, operating, and increasing steps until a base station is accessed.

6. The method of claim 4, wherein the searching step further includes a step of aborting the searching upon accessing a base station.

7. The method of claim 4, wherein the sequence of carrier spectrums includes at least one digital carrier spectrum.

8. The method of claim 7, wherein the sequence of carrier spectrums further includes at least one analog carrier spectrum.

9. The method of claim 7, wherein the digital carrier spectrum includes a code division multiple access (CDMA) channel, and wherein the attempting step includes searching through pseudo-random number (PN) code timing positions for a CDMA pilot signal.

10. The method of claim 9, wherein the attempting step farther includes a step of searching only once through all PN code timing positions for the CDMA pilot signal.

11. The method of claim 4, wherein the operating step includes terminating the reduced power consumption mode responsive to detecting user key input matching only an emergency number pattern.

12. The method of claim 4, wherein the operating step includes steps of
  powering down a mobile station modem (MSM),
  powering down a mobile station receiver section after powering down the MSM, and
  powering down a mobile station central processing unit (CPU) after powering down the receiver section.

13. The method of claim 12,
  wherein the step of powering down the MSM includes loading power control registers in the MSM to slow clocks used by the MSM,
  wherein the step of powering down the receiver section includes driving a sleep control line communicating with the receiver section, and
  wherein the step of powering down the CPU includes loading power control registers in the CPU to slow clocks used by the CPU.

14. A mobile station power control apparatus comprising:
  a base station unavailability detection mechanism including a rotationless carrier spectrum sequence searcher configured to search only once through a sequence of carrier spectrums; and
  a sleep mode controller responsively connected to said base station unavailability detection mechanism to invoke a reduced power consumption mode responsive to base station unavailability.

15. The apparatus of claim 14, wherein said base station unavailability detection mechanism includes a digital base station unavailability detection device and an analog base station unavailability detection device.

16. The apparatus of claim 14, wherein said base station unavailability detection mechanism includes a CDMA pilot signal detection device.

17. The apparatus of claim 16, wherein said CDMA pilot signal detection device includes an early failure mechanism adapted to search only once through all PN code timing positions.

18. The apparatus of claim 14, further comprising a user key input detector, wherein said sleep mode controller is configured to terminate said reduced power consumption mode responsive to user key input detection.

* * * * *